Jan. 2, 1951 P. KOLLSMAN 2,536,292
ROTARY FLUID PRESSURE SEAL
Filed June 3, 1948 2 Sheets-Sheet 1

INVENTOR.
PAUL KOLLSMAN
BY
Howard G. Russell
his ATTORNEY

Jan. 2, 1951 P. KOLLSMAN 2,536,292
ROTARY FLUID PRESSURE SEAL
Filed June 3, 1948 2 Sheets-Sheet 2

INVENTOR.
PAUL KOLLSMAN
BY
Howard G. Russell
his ATTORNEY

Patented Jan. 2, 1951

2,536,292

UNITED STATES PATENT OFFICE 2,536,292

ROTARY FLUID PRESSURE SEAL

Paul Kollsman, New York, N. Y.

Application June 3, 1948, Serial No. 30,754

11 Claims. (Cl. 285—97.9)

This invention relates to improvements in rotary fluid pressure seals, particularly seals for shafts, bearings and other machine elements requiring pressure tightness between rotatable parts. More specifically, this invention provides an improved seal for surfaces lying substantially normal to the axis of rotation, occasionally called end, shoulder, or radial surfaces. Such surfaces are usually flat, but curved surfaces, for example spherical surfaces are sometimes employed where reasons of design require it.

According to conventional practice, fluid pressure seals for rotating parts are constructed as stuffing boxes in which packing material, for example a gasket of cotton, asbestos, leather, felt, or other suitable material, either with or without a lubricant, such as oil, grease, or graphite, is tightly packed or held between the rotating surfaces.

In order to make seals of the stuffing box type tight, the sealing material must be densely compressed and pressure be exerted against the surfaces to be sealed. The compression of the sealing material leads to considerable friction between the sealing member and the surface rotating with respect to the sealing member. The type of friction thus set up may be termed mechanical, dry, or rubbing friction, since it is not possible to maintain a lubricant between the moving surfaces for any length of time.

The conventional seals of the stuffing box type are quite unsatisfactory if used to seal a liquid or vapor having little or no lubricating properties, such as gasoline or alcohol, both of which have a tendency to penetrate the sealing material with the result that the lubricating constituents originally in the packing material are gradually lost leading either to a leak, or to increased friction, or both.

The present invention provides an improved seal which is liquid, gas, and vapor tight, may be used in contact with any kind of liquid, vapor, or gas, even those having no lubricating properties, and provides extremely little friction between the moving surfaces of the seal.

In the improved seal a lubricating film of liquid is built up and is automatically maintained between the moving surfaces of the seal as long as the parts rotate. The lubricating film may either be formed of fluid against which the seal is to be effective or a special lubricant may be added in cases where the pressure fluid is not suitable for furnishing a lubricating film.

In the improved seal the friction between the rotating parts is of the liquid or gliding type, as distinguished from mechanical, rubbing, or dry friction encountered in seals of the conventional stuffing box type.

The objects, features and advantages of this invention will appear more fully from the detailed description which follows accompanied by drawings, showing, for the purpose of illustration, preferred forms of the invention. The invention also consists in certain new and original features of construction and combination of elements hereinafter set forth and claimed.

Although the characteristic features of this invention which are believed to be novel will be particularly pointed out in the claims appended hereto, the invention itself, its objects and advantages, and the manner in which it may be carried out, may be better understood by referring to the following description taken in connection with the accompanying drawings forming a part of it in which:

Figure 1:
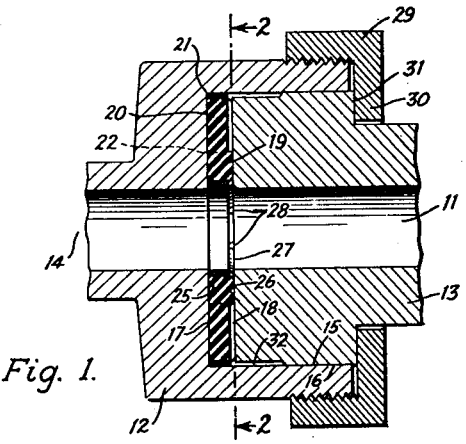
Figure 1 is a sectional side view of a seal of the axial type.

In the following description and in the claims various details will be identified by specific names for convenience. The names, however, are intended to be as generic in their application as the art will permit. Corresponding reference characters refer to corresponding parts in the several figures of the drawings.

In this description the term "fluid" or "pressure fluid" is being used as a generic term to include liquids, vapors and gases, and the term "fluid pressure" is used to designate pressure exerted by a liquid, vapor, or gas.

In the drawings accompanying, and forming part of, this specification, certain specific disclosure of the invention is made for the purpose of explanation of broader aspects of the invention, but it is understood that the details may be modified in various respects without departure from the broad principles of the invention and that the invention may be applied to other structures than the ones shown.

Referring to Figure 1 a fluid duct 11 extends through members 12 and 13. The members 12 and 13 are rotatable relatively to each other about an axis 14. For the sake of illustration it may be assumed that the member 12 is stationary and that the member 13 rotates with respect to the member 12 although, of course, the relationship may be reversed.

The members 12 and 13 are mounted for coaxial rotation by a cylindrical outer surface 15 on the member 13 fitting a cylindrical inner surface 16 in the member 12. Axial or shoulder surfaces 17 and 18 of the members 12 and 13 extend normal to the axis of rotation 14 and a fluid pressure tight seal is provided between these two surfaces.

A sealing disc or gasket 19 lies between the surface 17 and 18. The gasket is made of a suitable resilient, preferably non-porous sealing material, for example natural or synthetic rubber or synthetic plastic. The disc or gasket is suitably reinforced in order to sustain better the contact pressures exerted by the members 12 and 13. In the illustrated form of seal the resilient sealing material proper 20 is embedded between an outer ring 21 of metal having inwardly extending arms 22 and an inner ring 23 having outwardly extending arms 24 forming a spider. As is apparent from Figure 1 the height of the reinforcing rings is less than the thickness of the resilient material 20, and the rings are so arranged as to form a substantially plane back surface 25 with the resilient material 20 with which the sealing ring rests against the shoulder surface 17.

The opposite or front surface 26 of the sealing disc comprises protruding areas 27 along which the sealing material engages the axial or shoulder surface 18 and recessed areas 28 immediately above the reinforcing arms 22 and 24 forming channels extending into the body of the sealing material 20. The width of these channels is so selected that the channels will remain open under the greatest contact pressure to which the sealing ring may be subjected.

A threaded ring 29 having a flange 30 bearing against a shoulder 31 on the rotatable member 13 permits adjustment of the rotatable members 12 and 13 relatively to each other, whereby the contact force between the front surface 26 of the sealing disc and the sealing surface 18 of the rotatable member 31 may be varied.

The seal illustrated in Figure 1 operates as follows:

It may be assumed that the fluid flowing through the duct 11 possesses lubricating properties if brought into contact with the resilient material 20 of the sealing disc or gasket. Fluid enters the radially outwardly extending channels 28 above the inner ring or spider 23 and tends to seep between the elevated portion 27 of the seal and the sealing surface 18 of the member 13 by reason of capillary attraction along the edges of the channel 28. As long as the members 12 and 13 are at rest, however, the liquid is prevented from doing so by the force with which the sealing ring bears against the rotatable member 13, this force being variable at the threaded ring 29.

As soon as the member 13 begins to turn with respect to the disc 19 and the member 12, the fluid in the channels 28 is extended to the sealing area 27 in the form of a lubricating film. The film gradually spreads over the entire diameter of the sealing disc and a certain quantity of fluid collects in the radially inwardly extending channels formed by the arms 22 of the outer ring 21.

The lubricating film of fluid is extremely thin and is automatically maintained as long as the members 12 and 13 turn relatively to each other. A state of liquid friction is thus established between the sealing surface 27 and the shoulder 18, whereby the friction at the seal is reduced to a minimum. Once the lubricating film is established along the area of contact 27 further transfer of fluid ceases and the seal remains tight.

Since the radial portions 28, along which lubricating fluid is supplied, sweep the shoulder surfaces 18, the lubricating film never breaks down, but is constantly and automatically renewed.

When the members 12 and 13 stop turning, a certain amount of fluid remains between the sealing area 27 and the shoulder surface 18 thus reducing the starting friction when the members 12 and 13 begin to turn again.

The liquid retaining capacity of the inwardly extended channels 28 of the ring 21 may be increased by providing a suitable annular hollow space 32.

The sealing surface 27 is endless and extends substantially in zig-zag fashion between the radial channels 28. It includes a line of maximum contact pressure 33 which is an undulating line having portions extending obliquely in respect to the direction of rotation.

Figure 3:
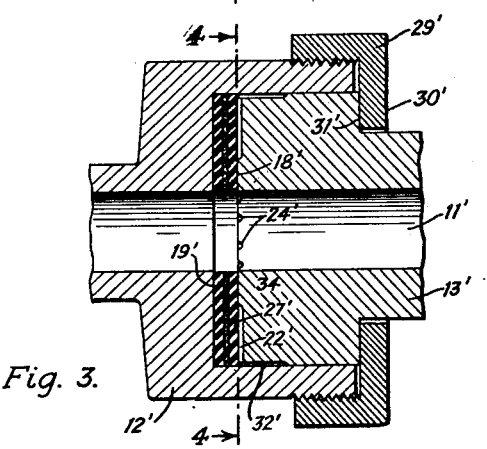
Figure 3 is a sectional side view of a modified form of axial seal.
Figure 4:
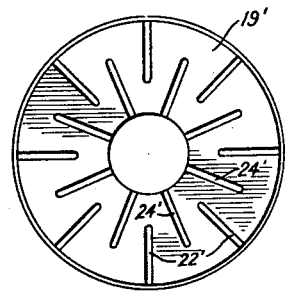
Figure 4 is a view of an end surface of one of the elements of the assembly shown in Figure 3, the view being taken on line 4—4 of Figure 3.

Figures 3 and 4 illustrate a modified form of seal in which a flat sealing disc is employed free from channels in its surface, the channels being provided in the shoulder surface of the rotatable member which turns with respect to the sealing disc. Because of the similarity in construction and function with the seals shown in Figures 1 and 3 primed reference numerals are being used to identify corresponding parts.

The rotatable members 12' and 13' are held together by a threaded ring 29' having a flange 30' resting against a shoulder 31' of the member 13'.

The sealing disc or gasket 19' is made by single ply or laminated to a reinforcing layer of fabric 34.

Radially outwardly extending channels 24' are formed in the shoulder surface 18'. The outwardly extending channels 24' alternate with radially inwardly extending channels 22'.

Fluid flowing duct 11' enters through the radially outwardly extending channels 24' and moistens radial portions of the sealing disc 19'. When the member 13 begins to turn with respect to the member 12' and the sealing disc 19', a lubricating film of liquid is spread over the contact surface 27' of the sealing disc. Gradually the film of liquid enlarges to cover the entire diameter of the sealing disc 19' and a certain amount of liquid collects in the radially inwardly extending channels 22' and in the peripheral annular space 32'.

The dimensions of the channels 22' and 24' are so selected with regard to the deformability of the resilient material of the ring 19' that even under maximum axial pressure the channels remain open to insure an uninterrupted supply of lubricating fluid.

Figure 2:
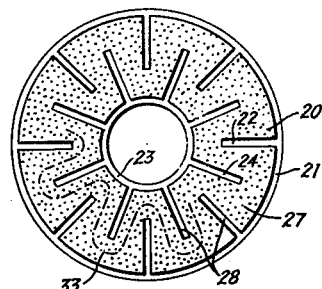
Figure 2 is a view of the sealing ring employed in the assembly in Figure 1, the view being taken on line 2—2 of Figure 1.

The operation of the seal illustrated in Figures 3 and 4 corresponds to that of the seals shown in Figures 1 and 2 previously described so that a separate description of the operation and features of the seal in Figure 3 may be dispensed with.

Figure 5:
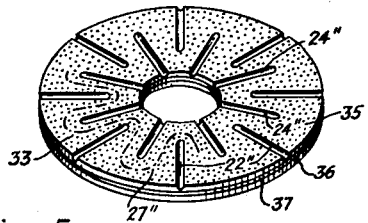
Figures 5 and 6 are perspective views of laminated sealing rings or gaskets for use in axial seals.
Figure 6:
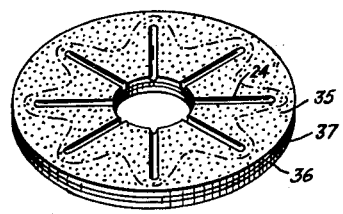

Figures 5 and 6 illustrate alternate forms of sealing discs for use in an assembly of the type of Figure 1. The disc shown in Figure 5 consists of three plies of laminations which are bonded together.

The outer laminations 35 and 36 are made of resilient sealing material, for example natural or synthetic rubber or synthetic plastic. The outer or face laminations 35 and 36 are bonded to a reinforcing center lamination of fabric whose principal purpose is to prevent distortion of the disc at the time the movable parts of the assembly begins to rotate, at which time a certain amount of dry friction exists between the front surface of the disc and the contacting surface of the respective rotatable member. Radially outwardly extending channels 24'' and radially inwardly extending channels 22'' are formed in the face lamination 35. Thus a contact area 27'' is formed along which the disc pressure tightly engages the preferably smooth, unbroken surface of the rotatable member, the line of maximum contact pressure being indicated at 33''. The channels 22'' and 24'' form recessed areas along which lubricating fluid is supplied to the sealing area 27''.

The sealing disc illustrated in Figure 6 corresponds in construction to the disc shown in Figure 5 except for the omission of radially inwardly extending channels. The outwardly extending channels 24'' are generally sufficient for the formation of a uniform film of liquid extending over the entire surface of the disc, since the film which initially extends to the ends of the channels 24'' gradually spreads to the periphery of the disc.

Figure 7:
Figure 7 is a sectional view illustrating a typical form of laminated material from which sealing rings or gaskets embodying the invention may be made.

Figure 7 illustrates, in cross section, a preferred construction of laminated sheet material for the manufacture of sealing discs. Top and bottom laminations 38 and 39 are reinforced by two laminations of fabric 40 and 41, the fabric in the laminations 40 and 41 being so arranged that the direction of the threads is dissimilar to provide for maximum strength, similar to the arrangement of the fabric plies in automobile tires. Surface grooves 32 are molded or cut into the top lamination 48, the width of the grooves being such that distortion of the top lamination by compression and surface friction will not cause the grooves to close.

Figure 8:
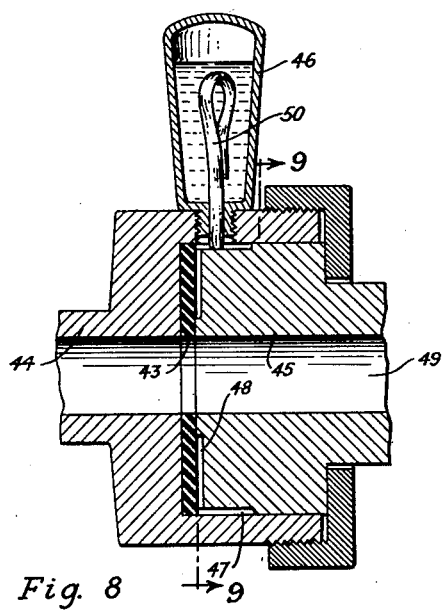
Figure 8 is a sectional side view of an axial seal in which a special lubricant is supplied to the sealing surfaces.
Figure 9:
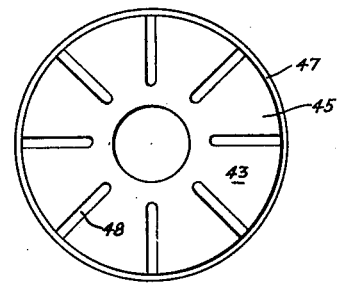
Figure 9 is a view of an end surface of one of the elements of the assembly shown in Figure 8, the view being taken on line 9—9 of Figure 8.

The constructions shown in Figures 8 to 11 are particularly adapted for sealing pressure fluids having no lubricating properties, for example gasoline and alcohol. The construction of the seal shown in Figure 8 is so similar to the construction illustrated in Figure 3 that a detailed description of corresponding structural details may be dispensed with.

The sealing disc or gasket 43 is made of flat sheet material and rests between the rotatable members 44 and 45. A suitable lubricant, for example oil or silicone fluid is fed from a cup 46 into an annular peripheral space 47 of the member 45 whence it reaches the front surface of the disc 43 through radially inwardly extending channels 48. No radially outwardly extending channels are provided similar to the channels 24' in Figure 3 but the disc 43 seals the members 44 and 45 at the walls of the duct 49.

Lubricating fluid gradually fed from the cup 46, preferably through a wick 50, moistens the front surface of the sealing disc 43 along the portions exposed to the channels 48 and the lubricating fluid is spread over the entire front surface of the sealing disc 43 as soon as the member 45 begins to rotate.

Figure 10:
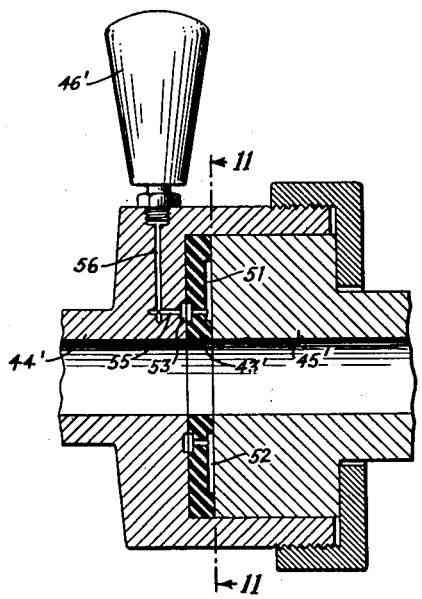
Figure 10 is a sectional side view of an axial seal of modified construction in which a lubricant is supplied to the moving surfaces of the seal.
Figure 11:
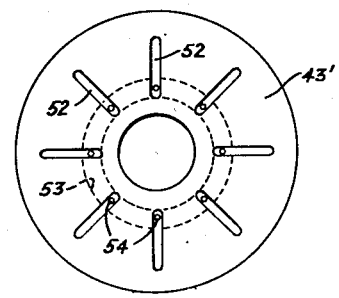
Figure 11 is a view of the sealing ring employed in the assembly of Figure 10, the view being taken on line 11—11 of Figure 10.

The construction of the seal shown in Figures 10 and 11 corresponds in many particulars to the construction illustrated in Figure 8. The end surface 51 of the rotatable member 45' is unbroken by channels but channels 52 for feeding and distributing lubricating fluid are formed in the sealing disc 43'. The sealing disc 43' has an annular channel 53 in its back surface communicating with the radial channels 52 through passages 54. Lubricating fluid is supplied to the annular passage 53 through ducts 55 and 55 from a cup 46'.

The sealing disc 43' is stationary with respect to the member 44'. Rotation of the member 45' causes a lubricating film of liquid supplied by the cup 46' to be spread over the entire front surface of the sealing disc 43' whereby friction is reduced to a minimum.

The invention thus offers an improved rotary seal providing fluid tightness between rotating parts, while maintaining a condition of liquid friction between the rotating parts, as distinguished from mechanical or rubbing friction found in seals of the stuffing box type.

The seal is equally effective for sealing liquids, gases and vapors both of the type having lubricating properties and the type lacking such properties. In instances where a separate lubricant is supplied, it is preferable to select one which is not chemically affected by the pressure fluid to be sealed.

Obviously the present invention is not restricted to the particular embodiments herein shown and described. Other sealing assemblies and other shapes and forms of sealing discs may be designed to meet specific requirements. Thus numerous changes and modifications may be made without departure from the spirit and the essence of this invention.

What is claimed is:

1. A rotary fluid pressure seal for a surface of a rotatable member, said member surface extending transversely to the axis of rotation of the member, the seal comprising, a retainer; a resilient sealing disk in said retainer constrained by said retainer to bear with a disc surface against said member surface under compression, at least one of the contacting surfaces having elevated portions and depressed portions forming areas of engagement, and areas of clearance, respectively, between said surfaces, the areas of engagement being continuous about the axis of rotation and extending at least in part, obliquely with respect to the direction of rotation, whereby bordering edges of the areas of engagement continuously sweep the disk surface, automatically distributing thereon, and maintaining, a lubricating film of fluid.

2. A fluid pressure seal of the axial type for a surface of a rotatable member, said member surface extending transversely to the axis of rotation of the member, the seal being characterized by a resilient sealing disk constrained to bear with a disk surface against said member surface under compression, at least one of the contacting surfaces having elevated portions and depressed portions providing, respectively, areas of engagement and areas of clearance between said surfaces, the areas of engagement being continuous and comprising within them an endless line of maximum contact pressure, said line extending, at least in part obliquely with respect to an imaginary circle about the axis of rotation, whereby, on rotation of said sealing surface relatively to said disk fluid in said areas of clearance is automatically spread as a lubricating film between said member surface and said disk surface at areas of contact.

3. In a fluid pressure seal of the axial type for sealing opposed surfaces of two members rotatable with respect to each other, said member surfaces extending transversely to the axis of rotation, the seal including a resilient sealing ring between said member surfaces, said ring being constrained to bear under compression against the member surface which is free to rotate with respect to the ring, the improvement which consists in the provision of a channel between a ring surface and the contacting member surface, said channel extending, at least in part, obliquely to an imaginary circle about the axis of rotation and forming an area of clearance between said last named ring surface and the associated member surface, the area of clearance extending into a continuous area of engagement between said ring surface and said associated member surface, said area of engagement extending entirely about said axis of rotation, the said channel serving to feed fluid between said disk and said rotatable member, the fluid upon rotation being automatically spread out as a lubricating film over said area of engagement, the film being automatically established and maintained by the sweeping action of the borders of said channel.

4. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the disc, characterized by a sealing disk of resilient material having elevated surface portions contacting said last named member surface, and depressed portions, the elevated portions being continuous and forming a sealing surface extending entirely about the axis of rotation, the depressed portions forming fluid retaining channels extending at least in part, obliquely to an imaginary circle about the axis of rotation, whereby a lubricating film of fluid is automatically established and maintained on said elevated sealing surface by rotation of said member surface relatively to said sealing disk.

5. A fluid pressure seal as set forth in claim 4 in which there is provided a source of lubricating liquid, separate from the fluid against which the seal is to be effective, said channels being in communication with, and supplied with liquid from, said source.

6. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the ring, characterized by a sealing disk of resilient material having elevated surface portions contacting said last named member surface, and depressed portions, the elevated portions being continuous and forming a sealing surface extending entirely about the axis of rotation, the depressed portions being substantially in the form of a spider extending from the center outwardly and forming fluid retaining channels, whereby a lubricating film of fluid is automatically established and maintained on said elevated sealing surface by rotation of said member surface relatively to said sealing disk.

7. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the ring, characterized by a sealing disk of resilient material having elevated surface portions contacting said last named member surface, and depressed portions, the elevated portions being continuous and forming a sealing surface extending entirely about the axis of rotation, the depressed portions extending substantially radially inward from the periphery and forming fluid retaining channels, whereby a lubricating film of fluid is automatically established and maintained on said elevated sealing surface by rotation of said member surface relatively to said sealing disk.

8. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the ring, characterized by a sealing disk of resilient material having elevated surface portions contacting said last named member surface, and depressed portions, the elevated portions being continuous and forming a sealing surface extending entirely about the axis of rotation, the depressed portions forming two separate spider patterns, a first spider extending with its arms substantially radially outwardly from the central portions of the disk and a second spider whose arms extend substantially radially inwardly from the periphery of the disk, leaving between them the elevated surface portions of substantially zig-zag outline extending between alternating arms of the two spiders, said depressed portions forming fluid retaining channels, whereby a lubricating film of fluid is automatically established and maintained on said elevated sealing surface by rotation of said member surface relatively to said sealing disk.

9. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the ring, characterized by a surface groove in the sealing surface of the member free to turn with respect to the resilient disk, said surface groove extending part way, but not entirely, across the sealing surface, obliquely to an imaginary circle about the axis of rotation, leaving continuous and uninterrupted a portion which extends entirely about the axis of rotation, said groove extending from a point of fluid supply, whereby a lubricating film of fluid is automatically established and maintained on said sealing surface by rotation of said free member with respect to said disk.

10. A fluid pressure seal of the axial type for sealing opposed surfaces of two members rotatable relatively to each other, said member surfaces extending transversely to the axis of rotation, the seal including a resilient sealing disk between said member surfaces, said disk being constrained to bear under compression against the member surface which is free to rotate with respect to the ring, characterized by a plurality of intercommunicating surface grooves in the sealing surface of the member free to turn with respect to the resilient disk, said surface grooves extending part way, but not entirely, across the sealing surface obliquely to an imaginary circle about the axis of rotation, leaving continuous and uninterrupted a portion of the sealing surface, which uninterrupted portion extends entirely about the axis of rotation, said grooves communicating with a point of fluid supply, whereby a lubricating film of fluid is automatically established and maintained on said sealing surface by rotation of said free member with respect to said disk.

11. A fluid pressure seal as set forth in claim 10 in which there is provided a source of lubricating liquid separate from the fluid against which the seal is to be effective, said surface grooves being in communication with, and supplied with liquid from, said source.

PAUL KOLLSMAN.

REFERENCES CITED

The following references are of record in the file of this patent:

FOREIGN PATENTS

| Number | Country | Date |
|---|---|---|
| 21,432 | Switzerland | Feb. 22, 1901 |